Nov. 26, 1968    F. S. GOULDING ET AL    3,413,529
SEMICONDUCTOR DETECTOR HAVING A LITHIUM COMPENSATED SHELF
REGION BETWEEN OPPOSITE CONDUCTIVITY TYPE REGIONS
Filed March 8, 1966                             2 Sheets-Sheet 1

INVENTORS
FREDERICK S. GOULDING
ROBERT P. LOTHROP

ATTORNEY

Nov. 26, 1968    F. S. GOULDING ET AL    3,413,529
SEMICONDUCTOR DETECTOR HAVING A LITHIUM COMPENSATED SHELF
REGION BETWEEN OPPOSITE CONDUCTIVITY TYPE REGIONS
Filed March 8, 1966                                2 Sheets-Sheet 2

INVENTORS
FREDERICK S. GOULDING
ROBERT P. LOTHROP

ATTORNEY

United States Patent Office 3,413,529
Patented Nov. 26, 1968

3,413,529
A SEMICONDUCTOR DETECTOR HAVING A LITHIUM COMPENSATED SHELF REGION BETWEEN OPPOSITE CONDUCTIVITY TYPE REGIONS
Frederick S. Goulding, Lafayette, and Robert P. Lothrop, Berkeley, Calif., assignors to the United States of America as represented by the United States Atomic Energy Commission
Filed Mar. 8, 1966, Ser. No. 534,974
4 Claims. (Cl. 317—234)

ABSTRACT OF THE DISCLOSURE

A thick semiconductor for detecting charged particle radiation and gamma rays, and having means for greatly reducing surface currents, to thereby increase the signal to noise ratio. A thin annular surface region encircles one of the contact terminals and separates the contact terminals of the semiconductor. Nearly the entire applied voltage is impressed transversely across the thin region, depleting the surface of all charge carriers and preventing surface currents.

---

Figure 1:
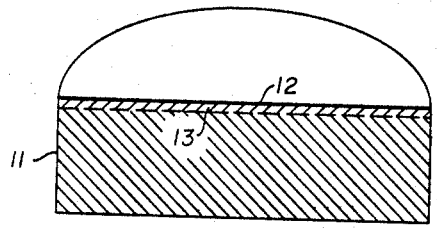

This invention relates generally to semiconductor electrical circuit elements and more particularly to a high voltage thick semiconductor diode. The invention described herein was made in the course of, or under, Contract W-7405-eng-48 with the United States Atomic Energy Commission.

This invention was primarily developed to provide a means for determining the energy of high energy charged particles as are produced, for instance, by particle accelerators such as a cyclotron. This invention is further useful for measuring the energy of X-rays. Accordingly, subsequent references to the measurement of charged particles will also apply to the detection of X-rays, and to some extent gamma rays.

Present semiconductor detectors are severely limited in that only relatively thin detectors can be effectively used. Thus, only the energy of low energy particles can be determined, since high energy particles are not stopped by a thin detector. The reason that a thick detector has been unsatisfactory is that in a thick detector using a low bias voltage i.e., less than 200 volts per millimeter, across the detector, the transit time of the holes and electrons across the detector is so long that an output pulse of slow rise time is produced and some of the holes and electrons can recombine before reaching the output terminals. The slow rise time means that long time constants must be provided in the accompanying electronic circuitry, which is detrimental in that the background noise level is high. Also, the recombination of holes and electrons leads to an inaccurate measurement of particle energy. If, on the other hand, the bias voltage across the semiconductor was raised to decrease the transit time of the holes and electrons across the semiconductor, the noise level from surface leakage current of the semiconductor rapidly becomes large, particularly when the voltage across the detector is above 100 to 200 volts per millimeter. Thus only thin semiconductors have heretofore been satisfactory for radiation counting.

The present invention provides advantageous operation over previous semiconductor diodes in that surface leakage current at high voltage is greatly reduced by providing a novel configuration obtained by a novel method of forming a semiconductor. The invention is advantageously comprised of lithium drifted silicon although the method and apparatus is by no means limited to such material. In general an electrical contact terminal is provided on each of two opposite surfaces of a thick body of semiconductor material. In the invention, the surface currents are largely eliminated by providing for the formation of an annular surface strip of very high resistivity around the detector between the negative and positive contacts. Ordinarily, the material from which a semiconductor detector is made has insufficiently high resistivity to eliminate surface currents from one contact to the other contact. In the novel configuration of the present invention, the operating bias voltage applied to the detector is used to create an intense electric field which entirely depletes the charge carriers along the surface around one of the two electrical contacts and thereby renders the ordinarily conductive surface material into a barrier which cannot conduct surface currents. The novel configuration of the detector provides for removal of surface charge carriers so that minimal surface current is present.

Voltages exceeding 500 volts per millimeter of detector thickness may be applied to the novel detector, resulting in a minimal hole and electron transit time and a minimal amount of hole and electron recombination.

It is an object of the present invention to provide a low noise thick higher voltage semiconductor diode and method of manufacture thereof.

It is another object of the present invention to provide a means for decreasing electron and hole transit time across a thick semiconductor diode.

It is another object of the present invention to provide for minimizing surface leakage current across a thick semiconductor diode.

It is another object of the present invention to provide a method for fabricating a radiation detector having a superior high voltage characteristic.

It is another object of the present invention to provide a semiconductor radiation detector having minimal noise signal.

Figure 3:
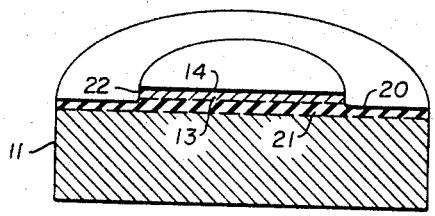
Figure 4:
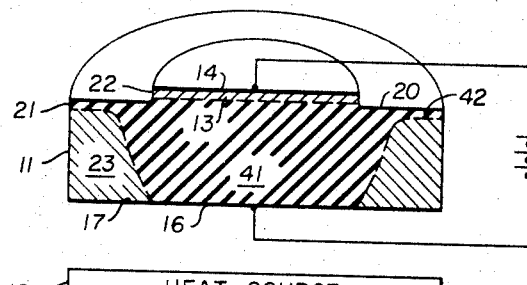
Figure 5:
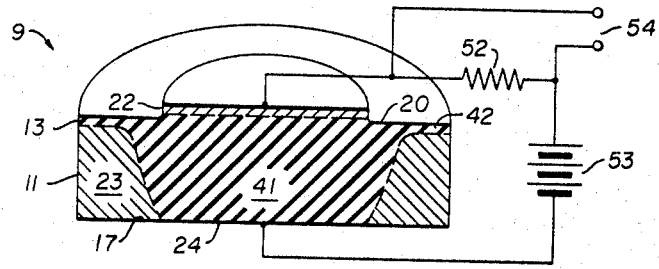
Figure 6:
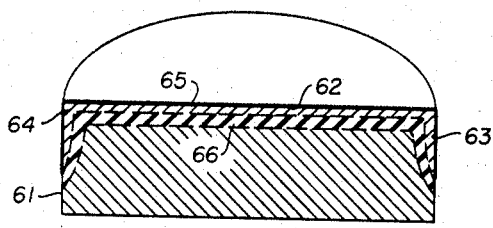
Figure 7:
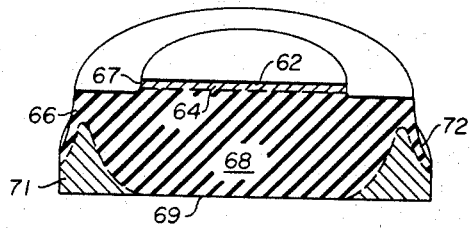

The invention will be best understood by reference to the following specification and the accompanying drawing of which:

FIGURES 1 to 4 each show a cross-section of a semiconductor radiation detector during progressive stages of fabrication utilizing the method of the present invention, FIGURE 5 is a circuit diagram showing the detector as used in a circuit, and FIGURES 6 and 7 are sectional drawings of another embodiment of a semiconductor particle detector during two successive stages in the fabrication thereof.

Referring to FIGURE 1, there is shown a cylindrical block 11 of P-type silicon crystal. A quantity of lithium is diffused into one surface 12 of the block 11, turning the diffused region 13 into N-type material. The means by which such lithium diffusion is accomplished is well known in the art and is described in an article in the periodical, Physical Review, vol. 119, No. 3, August 1960, pp. 1014–1021, entitled "Diffusion of Lithium in Silicon at High Temperature and the Isotope Effect."

Figure 2:
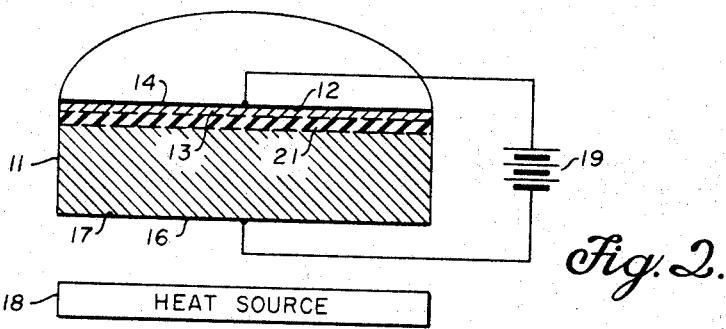

The next step in the fabrication of the detector is to apply an electrical contact 16 to the surface 17 and usually a contact 14 is also applied to the surface 12, the contacts being shown in FIGURE 2. The semiconductor crystal is then ready for the next fabrication step, shown in FIGURE 2, in which the crystal is heated to 120° to 150° centigrade from a heat source 18. While the crystal is heated, a back bias potential source 19, applied from contact 14 to contact 16, causes the lithium in N-region 13 to drift into P-region 11. Under the action of the electric field, a drifted region 21 is formed in which the negative lithium ions exactly compensate for the P-region acceptor ions, forming a very high resistivity material. It should be noted, however, that the surface resistivity of such material is not sufficiently high to eliminate surface currents. The drifting process is terminated after a thin drifted region 21 has been formed.

With reference to FIGURE 3, in the next fabrication step the peripheral portion of the contact 14 and N-layer 13 is etched away down to drifted region 21, thus leaving the remaining N-material and contact 14 on a pedestal or mesa 22 surrounded by drifted material 21. The drifted material 21 then has an annular flat exposed surface 20.

Referring to FIGURE 4, the drifting process is continued as in FIGURE 2 with the applying of heat from heat source 18 and a bias voltage from potential source 19. However, the lithium drifts from the mesa 22 toward the opposite surface 17, leaving an annular ring 23 of undrifted P-material around the circumferential region 21 of the detector. The lithium compensated drifted region 21 then has a main central columnar portion 41 and an outwardly extending shelf portion 42. A preferred means and method of controlling such a lithium drifting process in U.S. Patent No. 3,290,179, issued Dec. 6, 1966, in the name of F. S. Goulding, and entitled, Method and Apparatus For Determining Drift Depth of Impurity in Semiconductors. When the drifted region 21 has reached the face 17 of the detector, drifting is stopped. Face 17 then may be lapped to remove the contact 16, etched, and a gold contact 24 evaporated over the whole surface 17, as indicated in FIGURE 5. Such removal of contact 16 is particularly desirable if the lithium drifting means, described in the above-identified U.S. Patent No. 3,290,179 is followed.

The operation of the detector 9 will now be described with reference to FIGURE 5 in which associated circuitry is shown together with the prepared semiconductor. Charged particles 51 which are to be detected, enter through the gold coated surface 17 into the lithium compensated region 41. Detector bias, supplied by power supply 63 through a detector load resistor 52, produces an electric field in the compensated region 41 which sweeps out the free electrons and holes produced by charged particles 51. Thus, a particle causes a short current pulse to flow across the detector, producing an electrical signal across the load resistor 52. A pair of output terminals 54 are connected at each end of the load resistor 52 for convenient connection to output amplifiers and counting circuitry.

To better understand the operation of the invention, some of the surface characteristics of high resistivity silicon in a conventional diode should be considered. Normally the surface of any high resistivity silicon material which has been lithium drifted assumes an electrical character described as lightly N-type. Due to this, the surface layer surrounding an electrical contact on N-type material behaves as an electrical extension of the contact. With a high value of reverse potential, a substantial current flows in the surface layer surrounding the contact to the undrifted P-type material and on to the other contact. Such current has an irregular character which creates very undesirable "noise" in the output circuit. If the applied reverse voltage is raised above 100 to 200 v/mm., current along the surface layer to the P-type material rapidly becomes very appreciable.

The above-described surface current is eliminated in the present invention by the novel shelf configuration. The purpose of the shelf 42 is to prevent conduction along the surface 20 from the mesa 22 to the P-type region 23. When the reverse voltage is applied, the N-type surface 20 becomes positive with respect to the subsurface bulk as discussed above. However for a reasonably high applied voltage the whole of the compensated region (i.e., from mesa 22 to the back surface 17 and the whole of the shelf region 42 surrounding the mesa) is depleted of charge carriers. As would be expected, a transverse electric field is created in the semiconductor 9 from the face 17 to the mesa 22 and the surface 20. Since the shelf 42 is depleted, the resistivity of the shelf is much greater than the resistivity of the P-material 23, thus the electric field intensity is relatively very high across the shelf. If the potential provided by the power supply 53 has, for instance, a value of 100 volts, the transverse electric field across the shelf near the edge of the mesa typically is about 200 volts/mm. since the shelf is typically 0.5 mm. thick. The effect of an electric field of this magnitude acting normal to the surface 20 is to deplete the surface 20 of free electrons so that conduction along the surface in the N-type layer is no longer possible. The consequence of this surface depletion is that any further increase in the potential of power supply 53 causes no increase in leakage current and voltages as high as 500 volts/mm. or higher across region 41 can be applied to the device. A further advantage of pinching-off the surface current path in this manner is that electrical capacity arising from the surface 20 to the subsurface bulk is removed from the amplifier input thereby further improving signal-noise figures.

In a variation of the above-described structure of the invention, the shelf is extended down the sides of the semiconductor in addition to across the top in order to obtain a more compact detector. A compact structure is advantageous when an array of detectors is utilized since it is generally desirable to have a minimum of dead space between the sensitive portions of the individual detectors. The method used to fabricate such a semiconductor is essentially the same as that described with respect to FIGURES 1 to 4 except as discussed below.

In the step of diffusing lithium into the face of the semiconductor crystal, the lithium is diffused into not only a top surface, as described with reference to the first embodiment, but also into the adjacent side surfaces of the crystal. The pattern of such lithium diffusion is shown in FIGURE 6, wherein a block of P-type of semiconductor crystal 61 is shown with lithium diffused into one surface 62 and into a portion of adjoining side surface 63 to form an N-layer 64. A contact 65 is then applied to all of the surfaces which have been diffused with lithium. Heat and a bias potential are then applied as described with respect to FIGURE 2, the resultant drifting being terminated after a thin drifted layer 66 has been formed.

FIGURE 6, in which such drifted layer 66 is shown, indicates the configuration of the semiconductor after the first drifting step has been terminated. The N-layer 64 is then partially etched away down to the drifted layer 66, a portion of the surface being left unetched to form a mesa 67 as shown in FIGURE 7. Such etching process is the same described with respect to FIGURE 3 except with the addition that the side surface 63 is also etched away along with the peripheral portion of the top surface 62 surrounding the mesa 67.

The drifting process is then continued as previously described, a lithium compensated drifted region 68 being formed from the mesa 67 to the opposite surface 69, leaving an annular undrifted region 71. An annular ring 72, the peripheral part of the layer 66, assumes the same function as described with respect to the shelf 42 of the first embodiment.

As an example of the practice of the present invention, a first end surface of a cylinder of P-type silicon semiconductor crystal measuring 25 mm. in diameter by 5 mm. thick was diffused with N-type lithium to produce an N-type material. A gold evaporated contact was applied to the second opposite end surface of the cylinder. The crystal was heated to 125° C. and a 500 volt back bias applied until a drifted layer approximately 0.5 mm. thick was formed. The circumferential region of the first surface was then etched away 0.15 mm. deep down to the drifted region, leaving a 5 mm. diameter mesa. The drifting process was then continued as before until the drifting reached the second face. The second face was then lapped, etched and a gold contact applied. The diode was coupled to circuitry as hereinbefore described and found to operate satisfactorily with as high as 2500 volts bias with no significant increase in leakage current or noise as compared with conventional semiconductor diode detectors operated at much lower voltages.

A detector employing the diode was used to measure 30 mev. protons, the diode being maintained at −40° C. in this application. The low noise properties of the detector resulted in an energy resolution of better than 0.1%.

Many variations are possible within the spirit and scope of the invention and it is not intended to limit the invention except as defined in the following claims.

What is claimed is:

1. A semiconductor diode comprising a block of semiconductor material having a first face with a central zone encircled by an outer zone and having an opposite second face, said block of semi-conductor material having a body region extending between said central zone of said first face and said second face of high resistivity compensated material having an equal number of acceptors and donors per unit volume, said block further having an annular low resistivity region encircling said body region and forming an outer portion of said second face, said annular region having a first polarity and said central zone of said first face having a second opposite polarity, said body region further having an extended thin annular shelf of said high resistivity compensated material forming said outer zone of said first face encircling said central zone and in contact with said annular low resistivity region.

2. A semiconductor diode as described in claim 1 wherein said central zone of said first face is a raised mesa thereon, and wherein said annular shelf region comprising the outer zone of said first face encircles the base of said mesa.

3. A semiconductor diode as described in claim 1 wherein said material of said first polarity is P-type silicon, said material of said second polarity is N-type silicon, said body region and said shelf region being lithium drifted silicon.

4. A semi-conductor as described in claim 1 wherein said shelf region extends from said first face along the side surface of said semiconductor towards said second face.

References Cited
UNITED STATES PATENTS

| | | | |
|---|---|---|---|
| 3,116,183 | 12/1963 | Pell | 148—33.5 |
| 3,114,864 | 12/1963 | Sah | 317—234 |

JOHN W. HUCKERT, *Primary Examiner.*

M. H. EDLOW, *Assistant Examiner.*